United States Patent
Bell et al.

[11] 3,714,322
[45] Jan. 30, 1973

[54] METHOD FOR PREPARING HIGH PURITY 233 URANIUM

[75] Inventors: Michael J. Bell, Marvin E. Whatley, both of Oak Ridge, Tenn.

[73] Assignee: The United States of America as represented by the United States Atomic Energy Commission

[22] Filed: June 10, 1970

[21] Appl. No.: 45,086

[52] U.S. Cl. ............423/5, 423/19, 23/252, 252/301.1 R
[51] Int. Cl. .............................C01g 43/06
[58] Field of Search ..........23/325, 326; 176/37, 49; 252/301.1

[56] References Cited

UNITED STATES PATENTS

| | | | |
|---|---|---|---|
| 3,395,991 | 8/1968 | Grimes et al. | 23/325 |
| 3,046,088 | 7/1962 | Horn | 23/326 |
| 3,577,225 | 5/1971 | Shaffer et al. | 23/325 |
| 3,472,633 | 10/1969 | McNeese et al. | 23/325 |
| 3,208,912 | 9/1965 | Jaye et al. | 176/37 |

OTHER PUBLICATIONS

AEC document BNL-483, Thorium U233 Symposium, Jan. 9, 1958, pp. 40, 41

*Primary Examiner*—Carl D. Quarforth
*Assistant Examiner*—F. M. Gittes, Jr.
*Attorney*—Roland A. Anderson

[57] ABSTRACT

A method for preparing high purity $^{233}$uranium is provided by processing molten salt reactor fuels containing protactinium isotopes in a series of at least two hold-up tanks wherein in the first tank, decay of $^{232}$protactinium to $^{232}$uranium is permitted to a preselected value and the $^{232}$uranium is removed by subsequent fluorination. In the second tank, decay of $^{233}$protactinium to $^{233}$uranium is permitted to a preselected value and the $^{233}$uranium, which is highly depleted in $^{232}$uranium, is recovered by subsequent fluorination.

2 Claims, 1 Drawing Figure

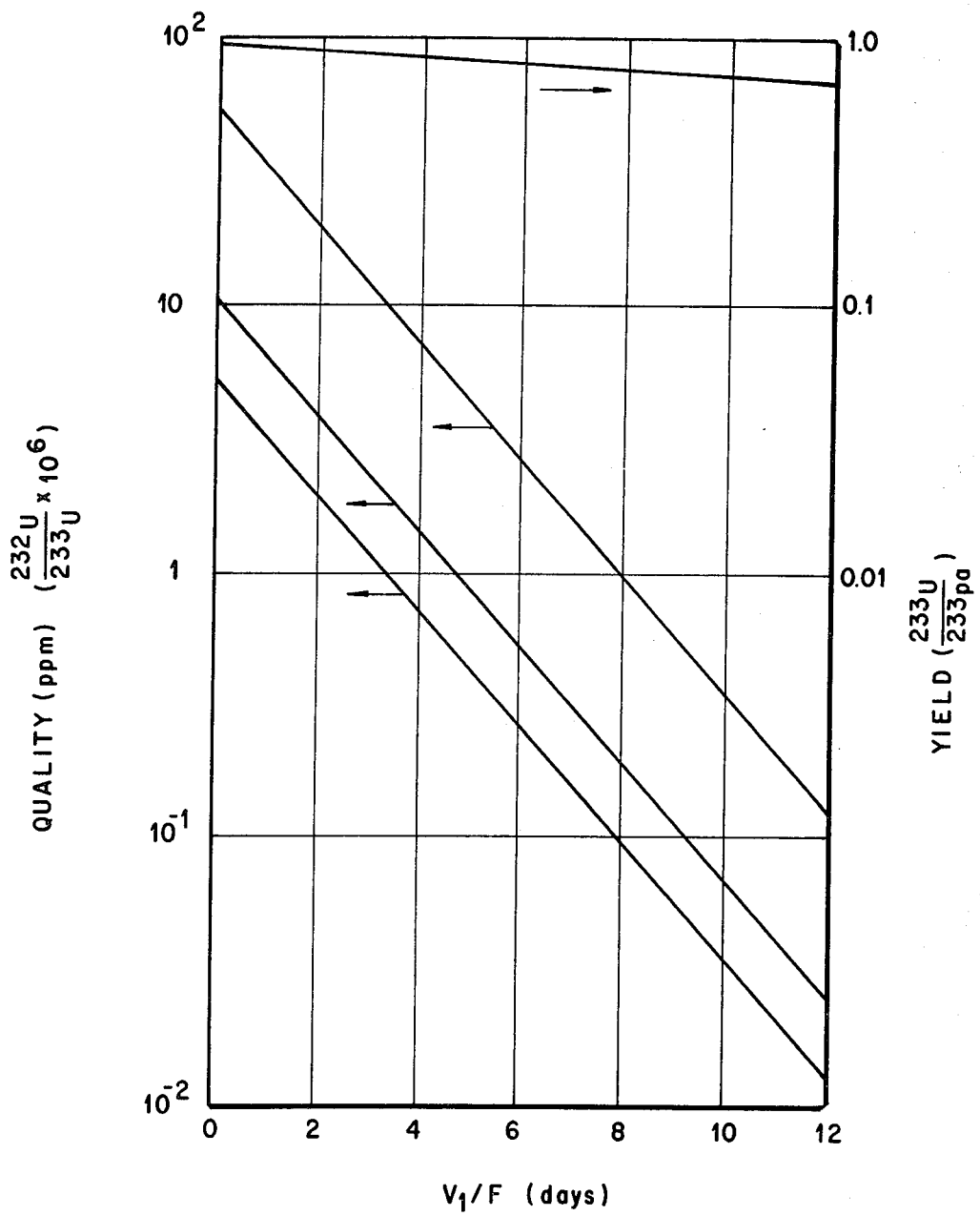

3,714,322

METHOD FOR PREPARING HIGH PURITY 233 URANIUM

BACKGROUND OF THE INVENTION

The invention herein was made in the course of, or under, a contract with the United States Atomic Energy Commission. It relates generally to methods for preparing nuclear fuels and more particularly to a method for preparing high purity $^{233}$uranium from molten salt reactor fuels.

The concept of a reactor fueled with a molten metallic salt mixture which contains fissile and/or fertile materials has been widely investigated and has been demonstrated. In the molten salt reactor technology a recent reactor concept which comprised a single fluid, double region molten salt breeder reactor has been fully described in Ser. No. 733,843, filed on June 3, 1968, in the names of Edward S. Bettis et al. for "Single Fluid Molten Salt Nuclear Breeder Reactor." Various methods have been devised to reprocess these molten salt fuels. In one method reductive extraction techniques are employed to separate the various contaminants such as protactinium and rare earths from the salt mixture, and in such processes one product stream contains the isotopes of protactinium, specifically $^{231}$protactinium, $^{232}$protactinium and $^{233}$protactinium.

Previously, the stream containing the protactinium was passed outside of the reactor where the protactinium was permitted to decay to corresponding uranium isotopes which were then recycled to the fuel salt or removed for specific purposes. The uranium normally contained several hundred ppm $^{232}$uranium. If the uranium was to be processed for other than recycle to the reactor, as for example, to produce reactor fuel plates, the activity associated with the $^{232}$uranium and its daughters increased the difficulties of the reprocessing. Accordingly, it is desirable to provide a method for preparing $^{233}$uranium with a very low quantity of $^{232}$uranium.

SUMMARY OF THE INVENTION

The present invention includes a method for preparing high purity $^{233}$uranium. More particularly, the method comprises passing a molten salt reactor fuel mixture containing protactinium isotopes to a first hold-up tank where $^{232}$protactinium is permitted to decay to $^{232}$uranium to a preselected value, fluorinating the molten salt mixture to remove essentially all of the uranium contained therein, passing the remaining molten salt mixture to a second hold-up tank where $^{233}$protactinium is permitted to decay to $^{233}$uranium to a preselected value, and thereafter fluorinating the molten salt mixture to remove essentially all of the uranium. The product uranium hexafluoride stream from the second fluorinator is highly depleted in $^{232}$uranium and serves as a feed for further processing into reactor fuels. Advantageously, the absence of $^{232}$uranium isotopes in the uranium product greatly simplifies this subsequent processing by reducing the high level of radiation which has heretofore been attendant with the mixed uranium product. A uranium product having a quality (atomic ratio of $^{232}$U/$^{233}$U) of 1 ppm is readily achieved for molten salt mixtures containing an initial atomic ratio of $^{232}$Pa/$^{233}$Pa of 50 ppm, using a hold-up time of 8 days in the first tank and a hold-up time of 120 days in the second tank.

BRIEF DESCRIPTION OF THE DRAWING

The sole drawing is a graph relating the quality and yield of the $^{233}$uranium product (as uranium hexafluoride) to the hold-up time for $^{232}$protactinium to $^{232}$uranium decay and the initial $^{232}$Pa/$^{233}$Pa concentration ratio.

DESCRIPTION OF THE PREFERRED EMBODIMENT

The present invention utilizes as a starting solution a molten salt reactor fuel containing protactinium isotopes. The particular method by which such a solution is provided is not critical to the successful practice of the invention. A convenient source of a molten salt solution containing protactinium isotopes is a product stream from a molten salt reprocessing method. In one of the well known methods for processing molten salt fuels, the molten salt is first fluorinated with fluorine gas to remove the bulk of the uranium and thereafter the fluorinated molten salt is contacted with molten bismuth containing a metal reductant, such as lithium or thorium, in a reductive extraction operation whereby the protactinium values are extracted into the metal phase; the rare earths in a separate extraction unit also are extracted from the molten salt solution into the metal phase. The protactinium-laden metal solution is next passed to an oxidizer where in the presence of hydrogen fluoride and a side stream of fluorinated molten salt solution the extracted protactinium metal values are oxidized to protactinium tetrafluoride and extracted into the salt phase. The exiting salt solution from the oxidizer has a protactinium content, which is concentrated by a factor of at least 50 times the reactor concentration and serves as the product feed to the hold-up tanks.

In accordance with the method of this invention the molten salt solution containing the protactinium values is passed to a first hold-up tank wherein the decay of $^{232}$protactinium to $^{232}$uranium is permitted to a preselected value. The flow through this hold-up tank should approximate plug flow, that is, no mixing, so that each portion of the salt is detained the same length of time. In practice, this may be effected by using, for example, a heated serpentine tube of proper length. The molten salt solution is then fluorinated with fluorine gas at 525° C. to remove essentially all of the uranium values, which comprise an impure mixture of $^{232}$uranium and $^{233}$uranium, as uranium hexafluoride. The protactinium values, not forming a volatile fluoride, remain in the molten salt solution. Thereafter the fluorinated salt solution is passed to a second hold-up tank of the same type wherein the decay of $^{233}$protactinium to $^{233}$uranium is permitted to a preselected value. Finally, the molten salt solution is again fluorinated with fluorine gas at 525° C. to remove essentially all of the uranium as a purified product ($^{233}$uranium hexafluoride). Again essentially no protactinium is removed in the fluorination.

The quality of the product, defined as the atomic ratio of $^{232}$uranium to $^{233}$uranium, in the product is given by $$Q = \left(\frac{232_{Pa}}{233_{Pa}}\right)_0 \frac{(1-e^{-\lambda_1 V_2/F})}{(1-e^{-\lambda_2 V_2/F})} e^{-(\lambda_1-\lambda_2)V_1/F}$$

where $\lambda_1$ is the radioactive disintegration constant for $^{232}$protactinium and equals 0.525 da$^{-1}$; $\lambda_2$ is the radioactive disintegration constant for $^{233}$protactinium and equals 0.0253 da$^{-1}$, $V_1$ and $V_2$ are the volumes of the first and second hold-up tanks, respectively, and F is the volumetric flow rate of the molten salt solution. Referring to the drawing, the transient time in the first hold-up tank is selected for the desired quality of the product, knowing the initial $^{232}$Pa/$^{233}$Pa ratio. The quality for such a system for initial atomic ratios of $^{232}$Pa/$^{233}$Pa of 50, 10, and 5 ppm are given in the drawing for a transient time ($V_2/F$) equal to 120 days as a function of the transient time ($V_1/F$) in the first hold-up tank. Although a transient time of 80 to 120 days for the second hold-up tank is preferred, it will be apparent here that other transient times in the second hold-up tank may be used provided they are sufficiently long in comparison to the transient times for the first hold-up tank. Where a time longer than 120 days is employed, there is little effect upon the yield or the quality of the product.

While the transient time in the first hold-up tank will vary depending upon the quality of the product and the initial atomic ratio of $^{232}$Pa/$^{233}$Pa, it is preferred that the transient time should be from 8 to 12 days. Longer decay times reduce the quantity of $^{232}$U in the product but also reduce the product yield. Longer times in either hold-up tank increase tank construction costs. Under such process conditions the quality of the product for initial atomic ratios of $^{232}$Pa/$^{233}$Pa of 50, 10, and 5 ppm, is 1, 0.2, and 0.1 ppm, respectively.

The yield of the system, i.e., the fraction of $^{233}$protactinium recovered as $^{233}$uranium is given by $Y = e^{-\lambda_2 V_1/F}(1 - e^{-\lambda_2 V_2/F})$. For a transient time of 120 days for the second hold-up tank, and 10 days for the first, the yield is 73.9 percent. Where the transient time for the second hold-up tank is greater than 120 days the yield is slightly higher.

Regarding the fluorine requirements in the fluorinators, the stoichiometric amount of fluorine required per mole of $^{233}$protactinium tetrafluoride entering the first fluorinator is $$Y = e^{-\lambda_2 V_1/F}(1 - e^{-\lambda_2 V_2/F}).$$

$$C_1 = \left[\left(\frac{232_{Pa}}{233_{Pa}}\right)_0 (1 - e^{-\lambda_1 V_1/F})\right] + (1 - e^{-\lambda_2 V_1/F})$$

and for the second fluorinator is $$C_2 = \left[\left(\frac{232_{Pa}}{233_{Pa}}\right)_0 e^{-\lambda_1 V_1/F}(1 - e^{-\lambda_1 V_2/F})\right] + e^{-\lambda_2 V_1/F}(1 - e^{-\lambda_2 V_2/F})$$

While the present invention provides for the production of high purity $^{233}$uranium using molten salt reactor fuels which contain protactinium isotopes, it also affords a convenient method for disposing of $^{231}$protactinium isotopes from these molten salt solutions. Because of its long half-life, essentially all $^{231}$protactinium remains in the molten salt solution. The $^{231}$protactinium isotopes may then be disposed of by either discarding the salt solution or removing it from the salt solution, such as by reductive extraction, prior to recycle of the salt solution to the reactor.

It will be apparent to those skilled in the art that elevated temperatures are required for the successful operation of the present invention. The molten salt reactor fuel solution should be maintained at a temperature above the liquidus temperature of the particular molten salt mixture employed. To insure a safe margin for process control, it is preferred that the temperature of the salt solution be maintained at least 25° C. above the liquidus temperature of the molten salt mixture and temperatures above about 800° C. are not recommended. The liquidus for the carrier salt mixture LiF − BeF$_2$ − ThF$_4$ (72 − 16 − 12 mole percent) is 500° C. The fluorinators should be operated at a temperature of about 525° C.

What is claimed is:

1. A method for isolating $^{233}$uranium isotopes from a single fluid molten salt reactor fuel solution containing protactinium isotopes comprising the steps of passing said solution to a first hold-up tank, holding up said salt solution for about 8 to 12 days for $^{232}$protactinium to decay to $^{232}$uranium to a preselected value, said $^{232}$uranium being present as uranium tetrafluoride, fluorinating the exiting salt solution from said first hold-up tank at a temperature of at least 25° C. above the liquidus temperature of said solution so as to form uranium hexafluoride from said uranium tetrafluoride, thus removing essentially all of the uranium in said solution as uranium hexafluoride, passing the fluorinated salt solution to a second hold-up tank, holding up said fluorinated salt solution for about 80 to 120 days for $^{233}$protactinium to decay to $^{233}$uranium to a preselected value and thereafter fluorinating the exiting salt solution from said second hold-up tank at a temperature of at least 25° C. above the liquidus temperature of said solution thus removing essentially all of the uranium formed from said decay of $^{233}$protactinium as $^{233}$uranium hexafluoride.

2. The method of claim 1 wherein said molten salt reactor fuel comprises LiF − BeF$_2$ − ThF$_4$ − UF$_4$ (71.7 −16 − 12 − 0.3 mole percent) having a total protactinium concentration of 0.003 mole percent and the quality of the $^{233}$uranium hexafluoride is 1 ppm $^{232}$U in $^{233}$U.

* * * * *